United States Patent
Liao et al.

(10) Patent No.: US 9,933,133 B2
(45) Date of Patent: Apr. 3, 2018

(54) LIGHT ADJUSTING SHEET AND BACKLIGHT MODULE USING THE SAME

(71) Applicant: Coretronic Corporation, Hsin-Chu (TW)

(72) Inventors: Chun-Yu Liao, Hsin-Chu (TW); Chao-Hung Weng, Hsin-Chu (TW); Min-Yi Hsu, Hsin-Chu (TW); Ming-Dah Liu, Hsin-Chu (TW)

(73) Assignee: CORETRONIC CORPORATION, Hsin-Chu (TW)

( * ) Notice: Subject to any disclaimer, the term of this patent is extended or adjusted under 35 U.S.C. 154(b) by 472 days.

(21) Appl. No.: 14/489,993

(22) Filed: Sep. 18, 2014

(65) Prior Publication Data
US 2015/0131313 A1    May 14, 2015

(30) Foreign Application Priority Data

Nov. 14, 2013    (CN) .......................... 2013 1 0566562

(51) Int. Cl.
*F21V 11/16*    (2006.01)
*F21V 8/00*    (2006.01)

(52) U.S. Cl.
CPC ............ *F21V 11/16* (2013.01); *G02B 6/0053* (2013.01)

(58) Field of Classification Search
CPC .. G02B 6/0025; G02B 6/0031; G02B 6/0053; G02B 6/0033; G02B 6/0051; G02B 6/005; G02B 5/045; F21V 11/16; F21V 5/02; G02F 2001/133507; G02F 2001/133607; G02F 1/133611
See application file for complete search history.

(56) References Cited

U.S. PATENT DOCUMENTS

| | | | |
|---|---|---|---|
| 7,628,526 B2 | 12/2009 | Lee et al. | |
| 7,699,518 B2* | 4/2010 | Yue ........................ | G02B 5/045 |
| | | | 362/606 |
| 8,638,408 B2* | 1/2014 | Wang ................... | G02B 3/0043 |
| | | | 349/62 |

(Continued)

FOREIGN PATENT DOCUMENTS

| CN | 101029941 A | 9/2007 |
|---|---|---|
| CN | 101131440 A | 2/2008 |

(Continued)

OTHER PUBLICATIONS

China Patent Office "Office Action" dated Jun. 2, 2016, China.

*Primary Examiner* — Bao Q Truong
(74) *Attorney, Agent, or Firm* — WPAT, PC

(57) ABSTRACT

A light adjusting sheet includes a base and a first light adjusting structure layer. The base includes a first surface and a second surface opposite to the first surface. The first light adjusting structure layer is disposed on the first surface of the base, and the first light adjusting structure layer includes a plurality of light adjusting structures. Each light adjusting structure includes a major axis, a minor axis and a thickness, wherein the major axis of the light adjusting structure is in parallel with an extending direction. A ratio of a length of the minor axis to a length of the major axis is between 0.093 and 0.6, and the thickness is between 2 μm to 6 μm. A backlight module using the light adjusting sheet can achieve high brightness and large viewing angle.

19 Claims, 9 Drawing Sheets

(56) References Cited

U.S. PATENT DOCUMENTS

| 8,848,132 | B2* | 9/2014 | O'Neill | G02B 6/0096 |
| | | | | 349/64 |
| 2002/0080598 | A1* | 6/2002 | Parker | G02B 6/0021 |
| | | | | 362/616 |
| 2011/0234580 | A1* | 9/2011 | Wang | G02B 3/0043 |
| | | | | 345/418 |

FOREIGN PATENT DOCUMENTS

| CN | 201251633 Y | 6/2009 |
| CN | 100507613 C | 7/2009 |
| CN | 101571246 A | 11/2009 |
| CN | 102162868 B | 5/2013 |
| TW | I356918 B | 1/2012 |

* cited by examiner

LIGHT ADJUSTING SHEET AND BACKLIGHT MODULE USING THE SAME

FIELD OF THE INVENTION

The invention relates to a light adjusting sheet, and more particularly to a light adjusting sheet applicable to a backlight module.

BACKGROUND OF THE INVENTION

A backlight module includes a reflection sheet, a diffusion sheet, a prism sheet, a light guide plate and a light source, wherein the light guide plate is one of the most important elements of the backlight module. A light beam from the light source enters the light guide plate via a light entering surface of the light guide plate, and the light beam is totally reflected in the light guide plate and transmitted to an end of the light guide plate opposite to the light entering surface. A plurality of dot patterns are disposed on a bottom surface of the light guide plate, and the dot patterns are used to destroy the total reflection of the light beam, thereby guiding the light beam to a light emitting surface of the light guide plate.

China Patent No. 100507613C discloses a scattering sheet having a plurality of elliptic scattering patterns on a back surface of the scattering sheet. An incident light beam is scattered to transmit in at least two directions by the elliptic scattering patterns, thereby having different intensities. Taiwan Patent No. I356918B discloses an illuminating apparatus including a light source, a diffusion sheet, a brightness enhancing sheet, and an anisotropic diffusion sheet. China Patent No. 102162868B discloses an optical plate including a base and a plurality of optical patterns, wherein planar projections of the optical patterns are circle shapes or ellipse shapes. U.S. Pat. No. 7,628,526B2 discloses a light condensing sheet including a light condensing film and a plurality of elliptic light condensing dots formed on the light condensing film.

FIG. 1A is a cross-section schematic diagram of a conventional backlight module. Referring to FIG. 1A, the backlight module 1 includes a light source 11, an inverse prism sheet 12, a diffusion sheet 13, a light guide plate 14 and a reflection sheet 15. The light guide plate 14 has a lateral surface 141, a light emitting surface 142 and a bottom surface 143. The light source 11 is disposed beside the lateral surface 141 of the light guide plate 14. The inverse prism sheet 12 and the diffusion sheet 13 are both disposed above the light emitting surface 142 of the light guide plate 14. The reflection sheet 15 is disposed below the bottom surface 143 of the light guide plate 14.

A light beam from the light source 11 transmits in the light guide plate 14 and then emits from the light emitting surface 142. The reflection sheet 15 is used to reflect a portion of the light beam emitting from the bottom surface 143 back to the light guide plate 14 to increase light using efficiency. The light beam emitted from the light emitting surface 142 of the light guide plate 14 passes through the inverse prism sheet 12 and the diffusion sheet 13, and then emits toward a liquid crystal display (not shown).

After the light beam emits from the light guide plate 14 of the backlight module 1, a transmitting direction of the light beam is corrected by inverse prism structures 121 of the inverse prism sheet 12. Thus, a proportion of the light beam perpendicularly emitting from the light emitting surface 142 can be increased.

Referring to FIG. 1B, the backlight module 1 has a problem that a vertical viewing angle is too small. In detail, the vertical viewing angle of the backlight module 1 depends on the inverse prism sheet 12. The light beam provided by the backlight module 1 with the inverse prism sheet 12 has a problem that a horizontal viewing angle (direction X) and a vertical viewing angle (direction Y) are obviously different, and this may lead to visually discomfort when a user rotates a display apparatus having the backlight module 1 and watches the display apparatus from different directions. For this reason, how to solve the above-mentioned problems is one of the important issues for the person skilled in the art. If another inverse prism sheet is added and the inverse prism structures of the two inverse prism sheets are perpendicular with each other, the problem of the narrow viewing angle can't be solved, but the brightness may be decreased and interference stripes may be produced. If another diffusion sheet is added, the added diffusion sheet and the inverse prism sheet may result in interference stripes.

SUMMARY OF THE INVENTION

The invention provides a light adjusting sheet for a backlight module to achieve high brightness and large viewing angle.

The invention further provides a backlight module including a light adjusting sheet to achieve high brightness and large viewing angle.

Other advantages and objects of the invention may be further comprehended through the technical features disclosed in the invention.

In order to achieve at least one of the objectives, an embodiment of the invention provides a light adjusting sheet including a base and a first light adjusting structure layer. The base has a first surface and a second surface opposite to the first surface. The first light adjusting structure layer is disposed on the first surface of the base. The first light adjusting structure layer includes a plurality of light adjusting structures. Each light adjusting structure includes a major axis, a minor axis and a thickness, wherein the major axis of each light adjusting structure is in parallel with an extending direction. A ratio of a length of the minor axis to a length of the major axis is between 0.093 and 0.6, and the thickness is between 2 μm and 6 μm.

In an embodiment of the invention, the light adjusting structures are at least disposed in a first column and a second column, the lengths of the minor axes of two adjacent light adjusting structures in the first column are the same, and the length of the minor axis of each light adjusting structure in the first column is different from the length of the minor axis of each light adjusting structure in the second column.

In an embodiment of the invention, in each of the first column and the second column, the lengths of the major axes of at least two of the light adjusting structures are different, and the thicknesses of at least two of the light adjusting structures are different.

In an embodiment of the invention, the light adjusting structures in the first column are arranged in a first linear line, the light adjusting structures in the second column are arranged in a second linear line, and the first linear line and the second linear line are extended in parallel with the extending direction.

In an embodiment of the invention, the light adjusting structures in the first column are arranged in a first continuous curved line, the light adjusting structures in the second column are arranged in a second continuous curved line, and the first continuous curved line and the second continuous curved line are extended along the extending direction.

In an embodiment of the invention, the first continuous curved line and the second continuous curved line are defined by a sine function or a cosine function.

In an embodiment of the invention, the first continuous curved line is defined by the sine function, and the second continuous curved line is defined by the cosine function.

In an embodiment of the invention, at least two of the light adjusting structures in the first column are partially overlapped with each other, and at least two of the light adjusting structures in the second column are partially overlapped with each other.

In an embodiment of the invention, at least one of the light adjusting structures in the first column is partially overlapped with at least one of the light adjusting structures in the second column.

In an embodiment of the invention, the lengths of the major axes of the light adjusting structures, the lengths of the minor axes of the light adjusting structures and the thicknesses of the light adjusting structures are changed randomly.

In an embodiment of the invention, at least one of the light adjusting structures is partially overlapped with at least one adjacent light adjusting structure.

In an embodiment of the invention, each light adjusting structure is a hemispheric three-dimensional structure having a convex surface protruded from the first surface, or a hemispheric three-dimensional structure having a concave surface recessed from the first surface.

In an embodiment of the invention, the light adjusting sheet further includes a second light adjusting structure layer disposed on the second surface of the base.

In order to achieve at least one of the objectives, another embodiment of the invention provides a backlight module including a light guide plate, a light source, a prism sheet, a reflection sheet and the above-mentioned light adjusting sheet. The light guide plate includes a light entering surface, a light emitting surface, and a bottom surface opposite to the light emitting surface. The light source is disposed beside the light entering surface of the light guide plate and configured to provide a light beam to the light guide plate. The prism sheet is disposed above the light emitting surface of the light guide plate. The light adjusting sheet is disposed above the prism sheet, and the reflection sheet is disposed under the bottom surface of the light guide plate.

In an embodiment of the invention, the backlight module further includes a diffusion sheet disposed above the light adjusting sheet.

In an embodiment of the invention, the prism sheet is an inverse prism sheet. The inverse prism sheet includes a plurality of stripe structures protruded toward the light emitting surface of the light guide plate, and lengthwise directions of the stripe structures are in parallel with the extending direction.

In an embodiment of the invention, the light guide plate includes a reverse prism light guide plate.

In view of the above mentioned embodiments, the embodiments of the invention may have at least one of following advantages. The light adjusting sheet of the embodiments has the light adjusting structure layer with the light adjusting structures, wherein the ratio of the length of the minor axis to the length of the major axis of the light adjusting structure is between 0.093 and 0.6, and the thickness of the light adjusting structure is between 2 μm and 6 μm. Applying the light adjusting sheet of the embodiments of the invention to the backlight module can increase the vertical viewing angle of the inverse prism sheet to make the vertical viewing angle be more symmetric with respect to the horizontal viewing angle and further prevent the visual defects such as hot spots or mura.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTIONS OF THE DRAWINGS

The invention will become more readily apparent to those ordinarily skilled in the art after reviewing the following detailed description and accompanying drawings, in which.

Figure 9A:
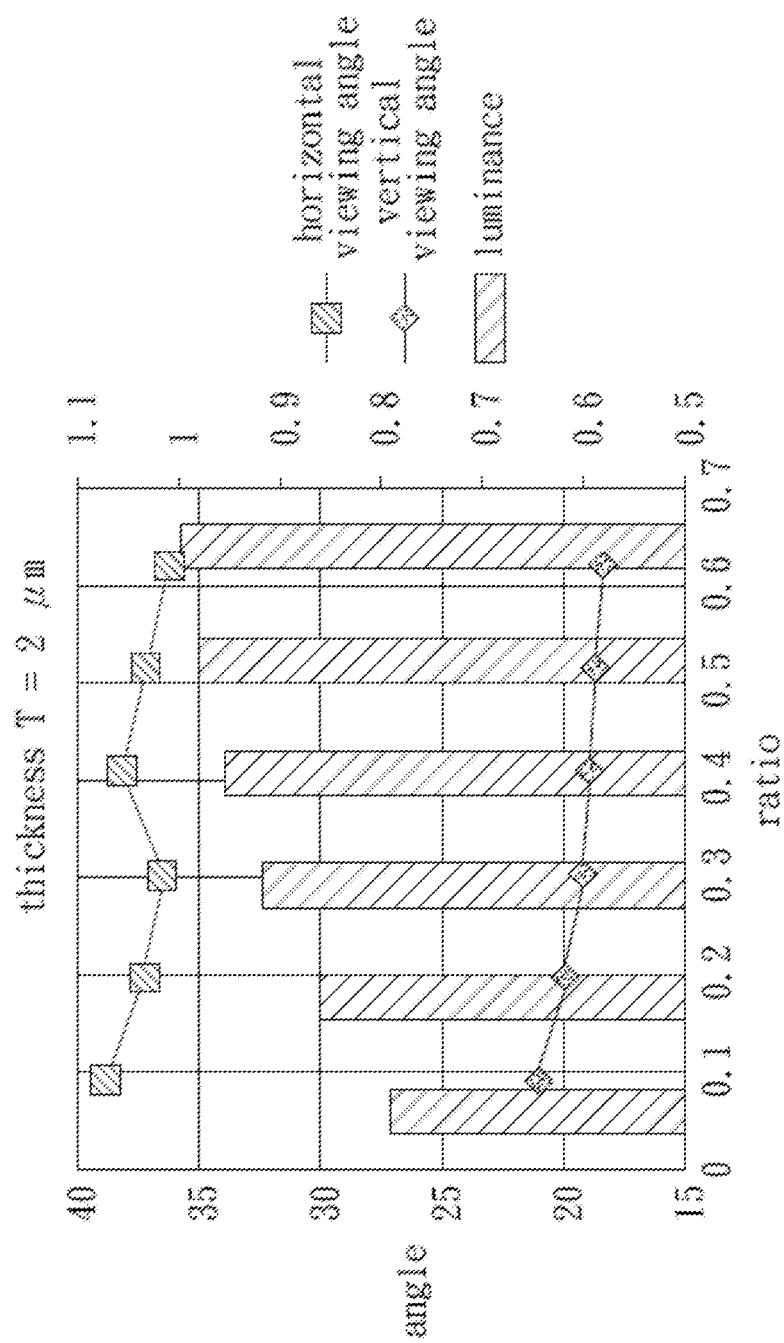
FIG. 9A is a schematic diagram showing relations between a viewing angle, luminance and a ratio of a length of a minor axis to a length of a major axis when a thickness of the light adjusting structure is 2 μm.
Figure 9B:
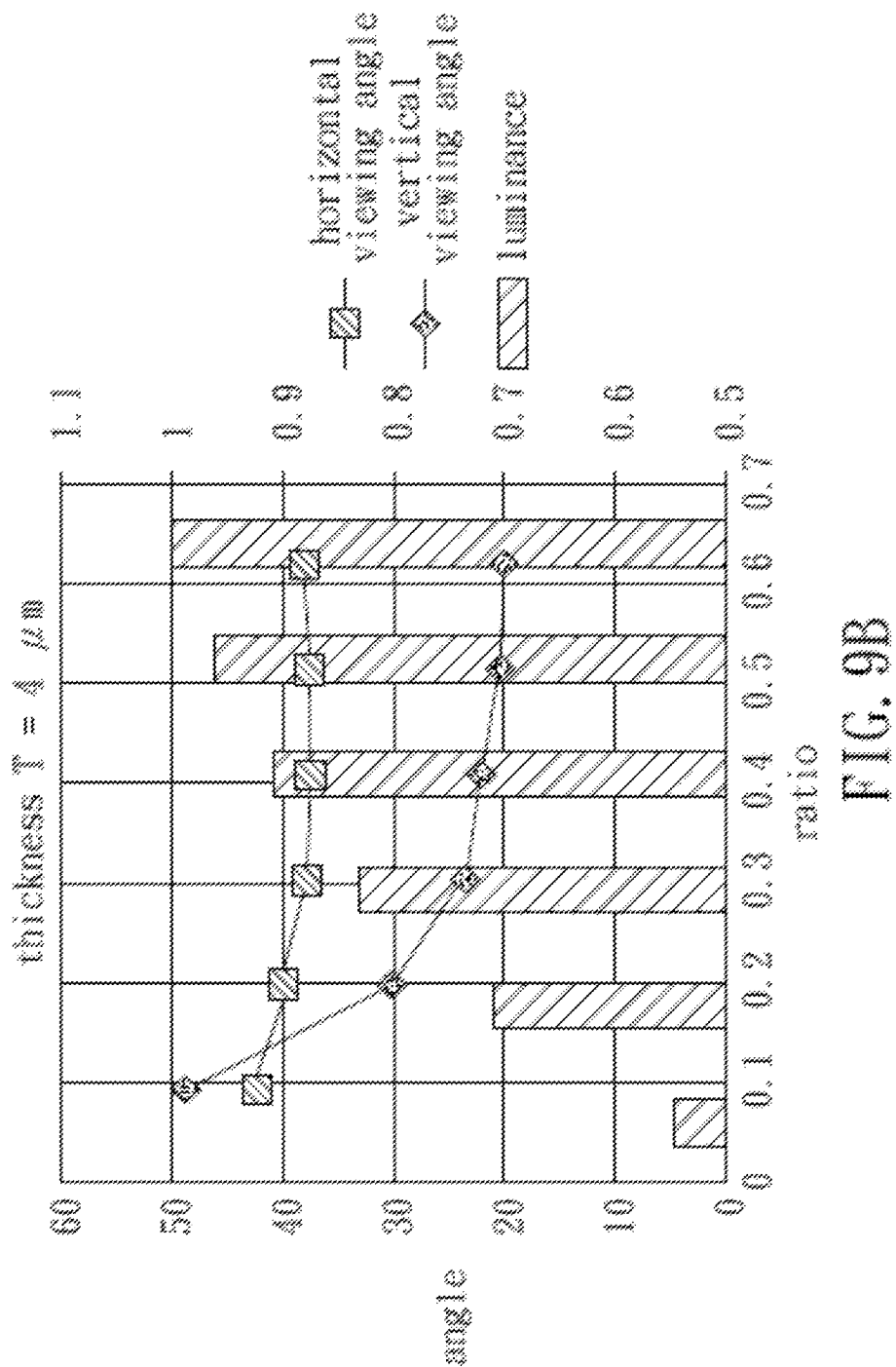
Figure 9C:
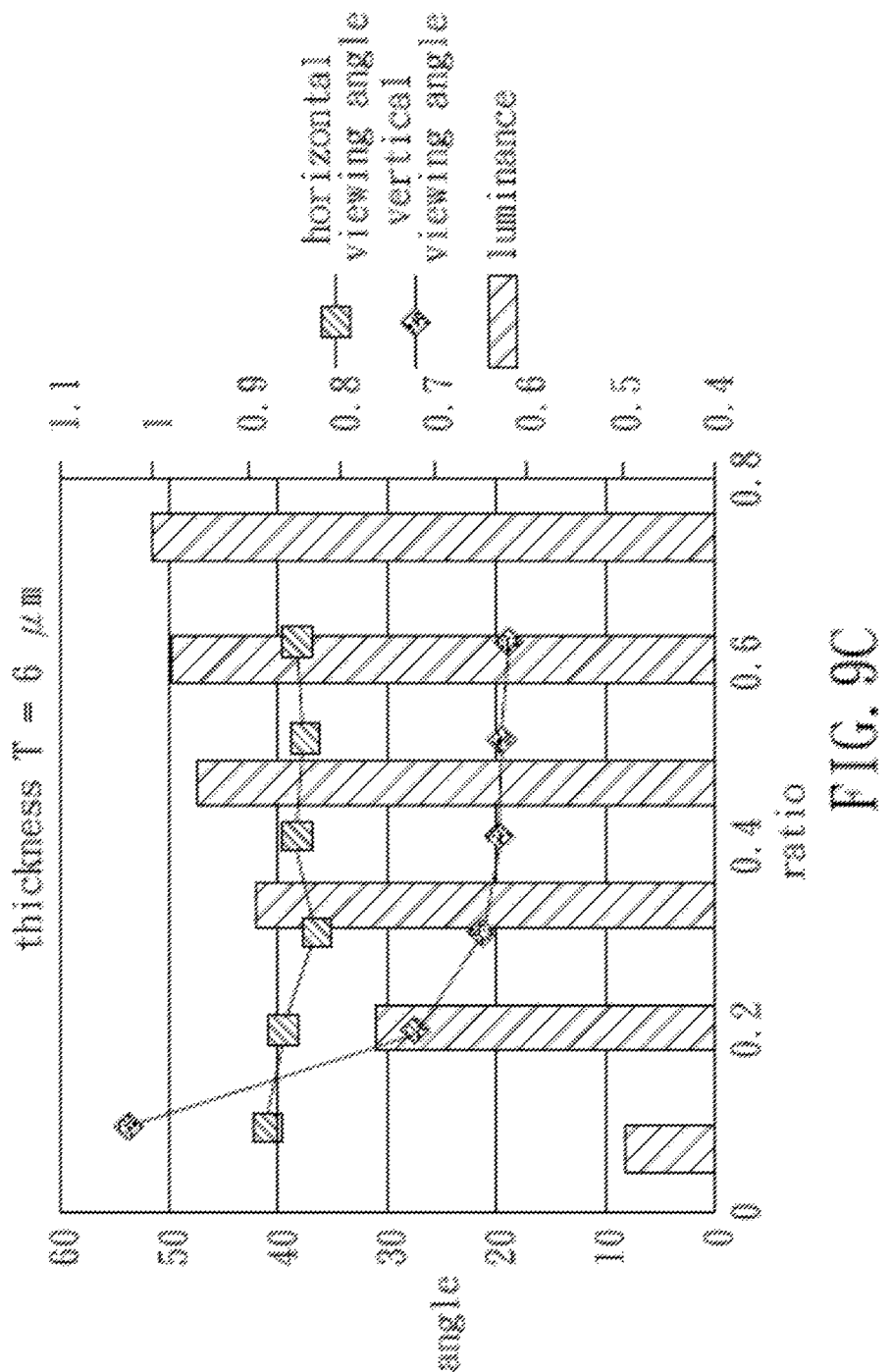

FIG. 9B is a schematic diagram showing relations between a viewing angle, luminance and a ratio of a length of a minor axis to a length of a major axis when a thickness of the light adjusting structure is 4 μm; and FIG. 9C is a schematic diagram showing relations between a viewing angle, luminance and a ratio of a length of a minor axis to a length of a major axis when a thickness of the light adjusting structure is 6 μm.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 2:
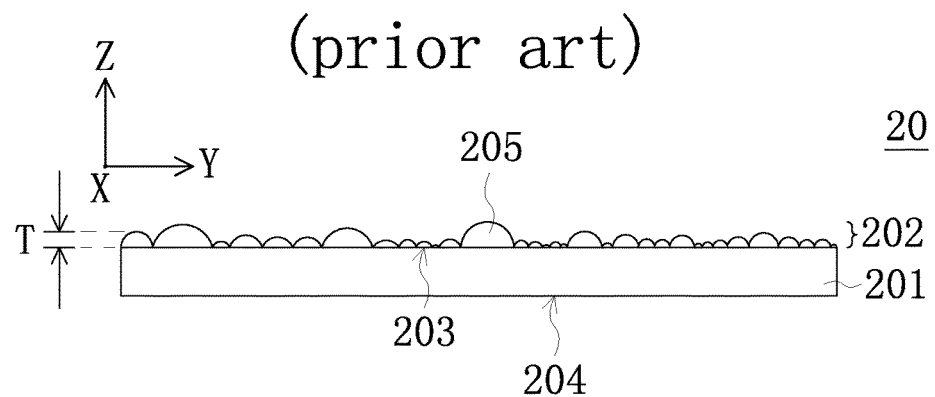
FIG. 2 is a cross-section schematic diagram of a light adjusting sheet according to an embodiment of the invention.
Figure 3:
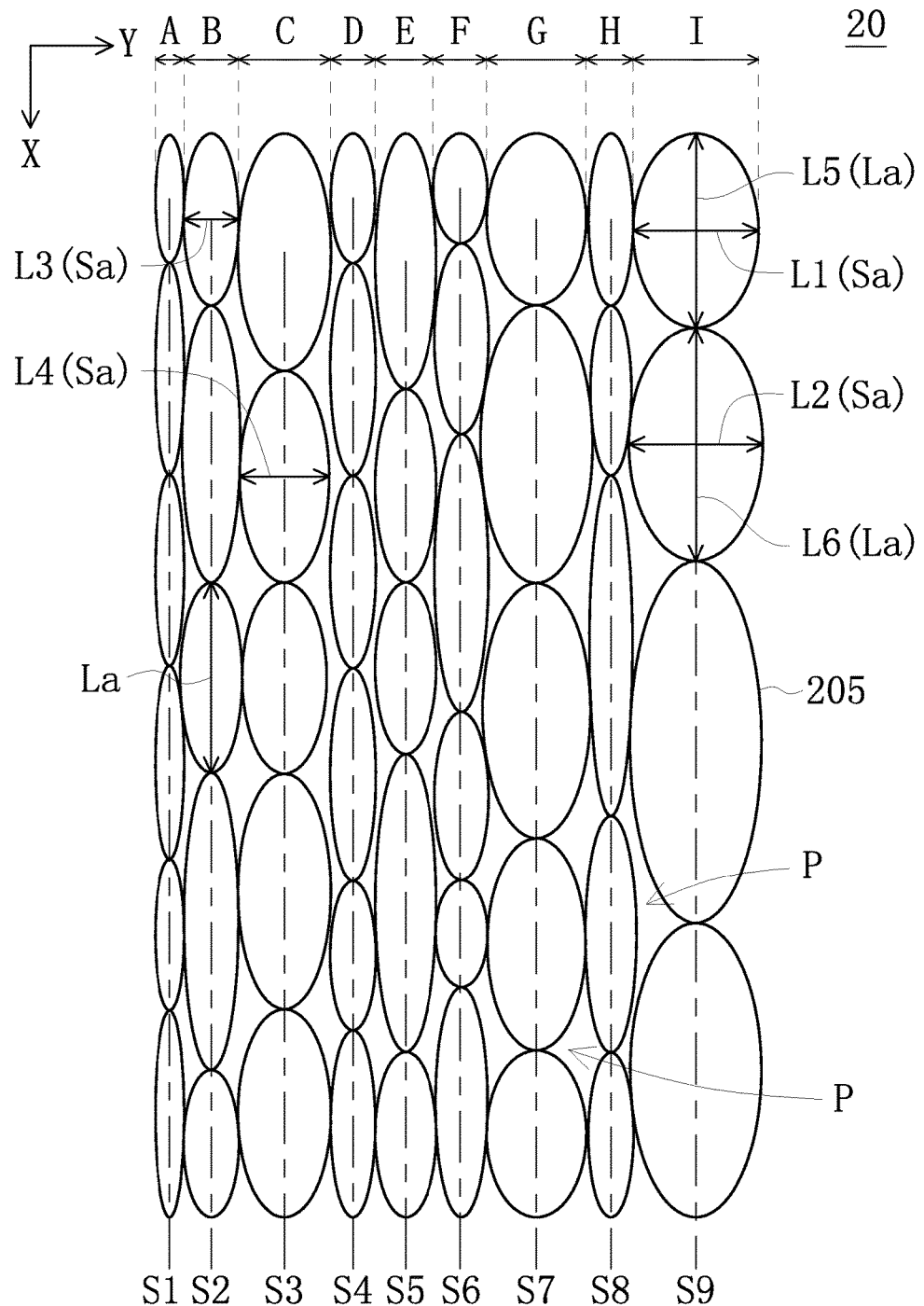
FIG. 3 is a schematic top view of the light adjusting sheet of FIG. 2.

FIG. 2 is a cross-section schematic diagram of a light adjusting sheet according to an embodiment of the invention, and FIG. 3 is a schematic top view of the light adjusting sheet of FIG. 2. Referring to FIG. 2, the light adjusting sheet 20 includes a base 201 and a first light adjusting structure layer 202. The base 201 has a first surface 203 and a second surface 204 opposite to the first surface 203. The first light adjusting structure layer 202 is disposed on the first surface 203 of the base 201. The first light adjusting structure layer 202 includes a plurality of light adjusting structures 205. Referring to FIG. 3, each light adjusting structure 205, for example, extends along an extending direction X. Each light adjusting structure 205 has a major axis La and a minor axis Sa, wherein the major axis La of each light adjusting structure 205 is in parallel with the extending direction X. Referring to FIG. 2, each light adjusting structure 205 has a thickness T. A ratio of a length of the minor axis Sa to a length of the major axis La of each light adjusting structure 205 is between 0.093 and 0.6, and the thickness T is between 2 μm and 6 μm. In addition, the second surface 204 can be a mirror surface or a rough surface.

Referring to FIG. 3, the light adjusting structures 205 of the first light adjusting structure layer 202 are disposed in a plurality of columns A-I. In the embodiment, the number of the columns of the light adjusting structures 205 is 9, but the invention is not limited to that. The number of the columns of the light adjusting structures 205 can be adjusted according to actual needs. In detail, the light adjusting structures 205 in the columns A-I, for instance, are respectively arranged in linear lines S1-S9. The linear lines S1-S9 are extended in parallel with the extending direction X. In each column (e.g. the column I), the lengths L1, L2 of the minor axes Sa of two adjacent light adjusting structures 205 are the same. Taking the light adjusting structures 205 in the column B (the light adjusting structures 205 arranged in the linear line S2) and the light adjusting structures 205 in the column C (the light adjusting structures 205 arranged in the linear line S3) for example, the length L3 of the minor axis Sa of each light adjusting structure 205 in the column B is not equal to the length L4 of the minor axis Sa of each light adjusting structure 205 in the column C. In addition, the lengths of major axes La and the thicknesses T of the light adjusting structures 205 in the columns A-I can be changed randomly. For example, the lengths of the major axes La of at least two of the light adjusting structures 205 are different, and the thicknesses T of at least two of the light adjusting structures 205 are different. For instance, the lengths L5 and L6 of the major axes La of two adjacent light adjusting structures 205 in the column I are different. According to the above-described design, the light adjusting structures in different columns are irregular, which can reduce defects such as hot spots or mura.

It should be noted that the first light adjusting structure layer 202 is disposed on the first surface 203 of the base 201, but the invention is not limited to that. In another embodiment, the first light adjusting structure layer 202 can be disposed on the second surface 204 of the base 201.

Furthermore, in the embodiment, each light adjusting structure 205, for example, is a hemispheric three-dimensional structure having a convex surface protruded from the first surface 203 of the base 201, but the invention is not limited to that. In another embodiment, each light adjusting structure 205, for example, is a hemispheric three-dimensional structure having a concave surface recessed from the first structure 203 of the base 201.

Figure 4:
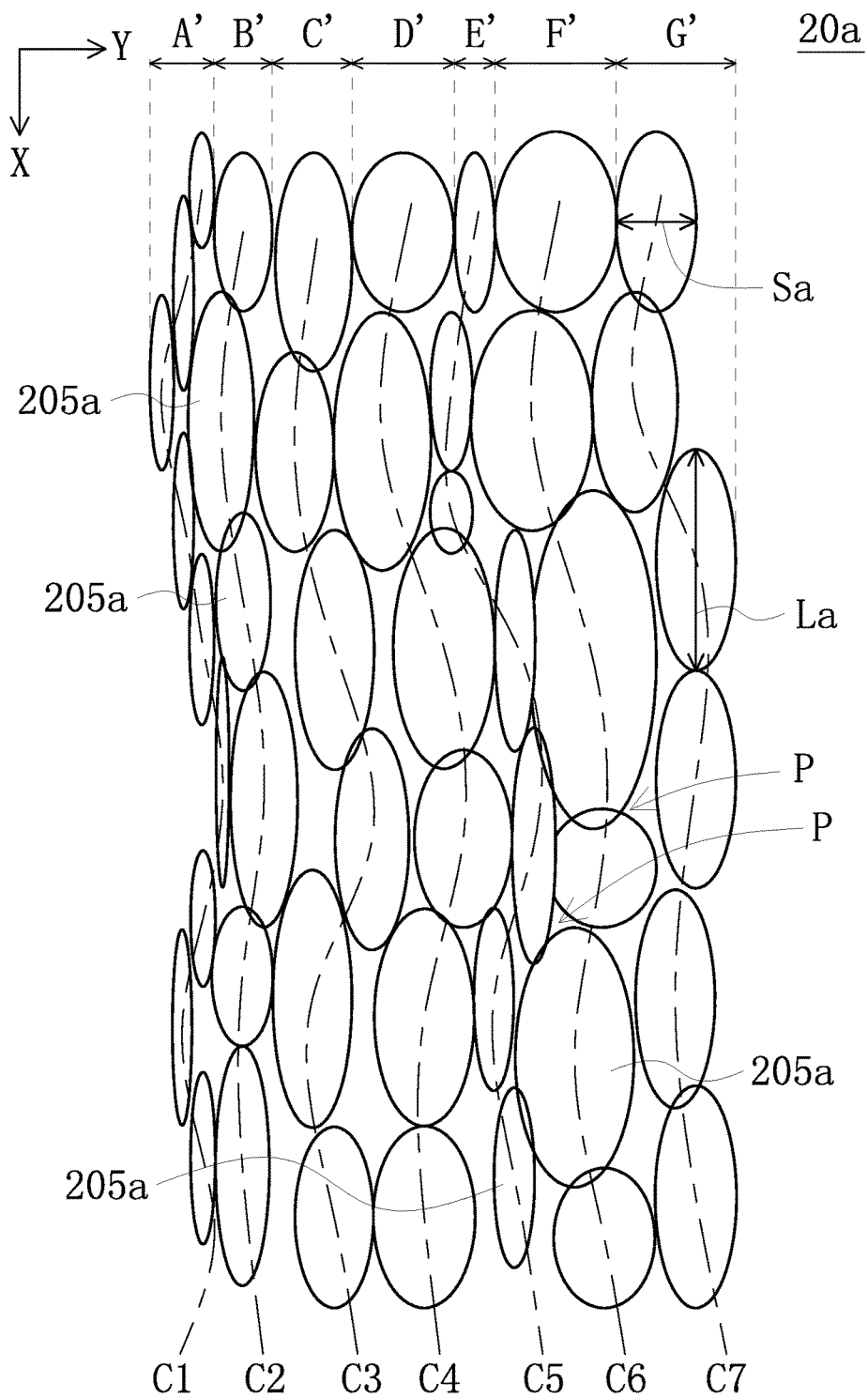
FIG. 4 is a schematic top view of a light adjusting sheet according to another embodiment of the invention.

FIG. 4 is a schematic top view of a light adjusting sheet according to another embodiment of the invention. Referring to FIG. 4, the light adjusting sheet 20a is similar to the light adjusting sheet 20 showed in FIG. 2 and FIG. 3. The difference is that the light adjusting structures in columns A'-G' of FIG. 4 are arranged in continuous curved lines C1-C7 respectively. The continuous curved lines C1-C7 are extended along the extending direction X. In each column, at least two light adjusting structures 205a are partially overlapped with each other. For example, in the column B', the second light adjusting structure 205a is partially overlapped with the third light adjusting structure 205a. In addition, taking the light adjusting structures in the columns E' and F' for example, at least one light adjusting structure 205a in the column E' is partially overlapped with at least one light adjusting structure 205a in the column F'. For instance, the seventh light adjusting structure 205a in the column E' is partially overlapped with the fifth light adjusting structure 205a in the column F'. The distribution area of the light adjusting structures 205a on the first surface 203 can be increased by the partially overlap of at least two light adjusting structures 205a in the same column or different columns, thereby decreasing a total area of plane regions P which are not covered by the light adjusting structures 205a so as to improve symmetry between a vertical viewing angle and a horizontal viewing. Therefore, in the embodiment showed in FIG. 3, at least two light adjusting structures 205 in the same column or different columns can be partially overlapped with each other to increase the distribution area of the light adjusting structures 205 on the first surface 203, thereby improving the symmetry between the vertical viewing angle and the horizontal viewing angle.

In the embodiment, the lengths of the major axes La, the lengths of the minor axes Sa and the thicknesses T of the light adjusting structures 205a in the columns A'-G' are similar to the light adjusting structures 205 showed in FIG. 2 and FIG. 3, and detailed description is omitted here.

It should be noted that in the embodiment, the continuous curved lines C1-C7, for example, are all defined by a sine function or a cosine function, but the invention is not limited to that. In another embodiment, the continuous curved lines C1-C7 can be defined by the sine function and the cosine function. For instance, the continuous curved lines C1, C3, C5, C7 are defined by the sine function, whereas the continuous curved lines C2, C4, C6 are defined by the cosine function. In an alternative embodiment, the continuous curved lines C1, C2, C3, C4 are defined by the sine function, whereas the continuous curved lines C5, C6, C7 are defined by the cosine function. In addition, comparing to the embodiment that the light adjusting structures 205 in the columns A-I are arranged along the linear lines S1-S9 (referring to FIG. 3), in the embodiment of FIG. 4, since the light adjusting structures 205a in the columns A'-G' are respectively arranged along the continuous curved lines C1-C7, an arrangement of the light adjusting structures 205a is more irregular, and this can further reduce the hot spots and the mura.

Figure 5:
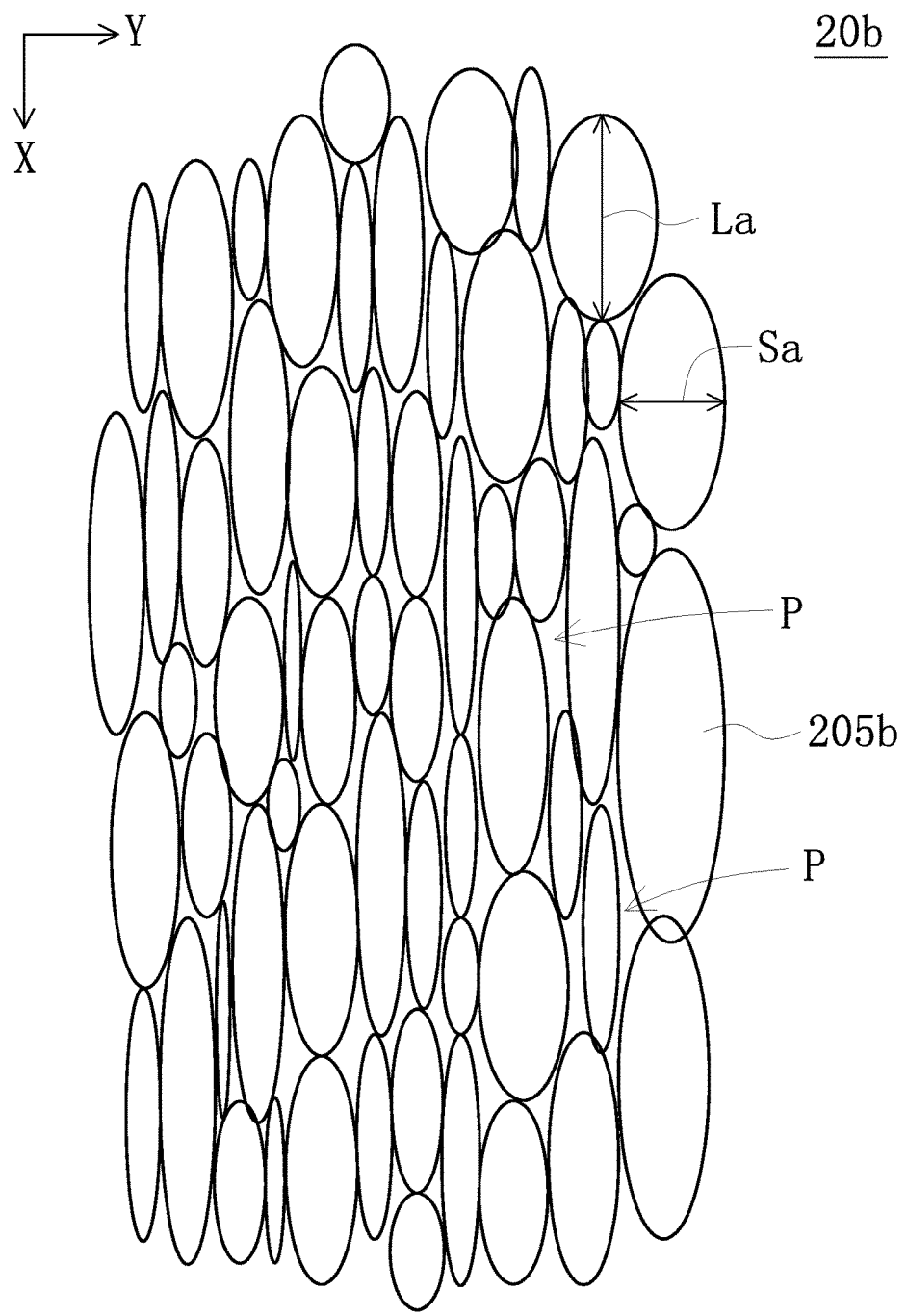
FIG. 5 is a schematic top view of a light adjusting sheet according to another embodiment of the invention.

FIG. 5 is a schematic top view of a light adjusting sheet according to another embodiment of the invention. Referring to FIG. 5, the light adjusting sheet 20b is similar to the light adjusting sheet 20 showed in FIG. 2 and FIG. 3. The difference is that the lengths of the major axes La, the lengths of the minor axes Sa, the thicknesses T and the arrangement of the light adjusting structures 205b are designed to be changed randomly, wherein at least one of the light adjusting structures 205b is partially overlapped with at least one adjacent light adjusting structure 205b. In addition, the arrangement of the light adjusting structures 205b showed in FIG. 5 are more irregular compared to FIG. 3 and FIG. 4, thereby further reducing the hot spots and the mura.

Figure 6:
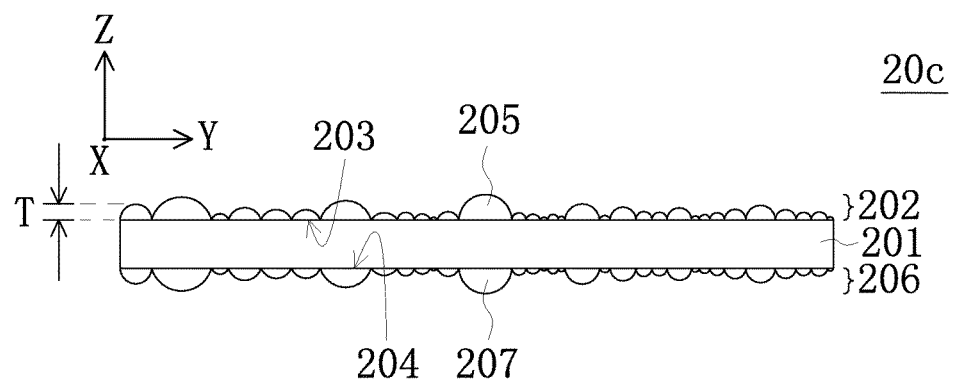
FIG. 6 is a cross-section schematic diagram of a light adjusting sheet according to another embodiment of the invention.

FIG. 6 is a cross-section schematic diagram of a light adjusting sheet according to another embodiment of the invention. Referring to FIG. 6, the light adjusting sheet 20c of the embodiment is similar to the light adjusting sheet 20 showed in FIG. 2 and FIG. 3. The difference is that the light adjusting sheet 20c further includes a second light adjusting structure layer 206. The second light adjusting structure layer 206 is disposed on the second surface 204 of the base 201 and includes a plurality of light adjusting structures 207. The lengths of the major axes La, the lengths of the minor axes Sa, the thicknesses T and the arrangement of the light adjusting structures 207 may be, but not limited to, similar to that of the light adjusting structures 205, 205a or 205b in FIG. 2-FIG. 5.

Figure 7A:
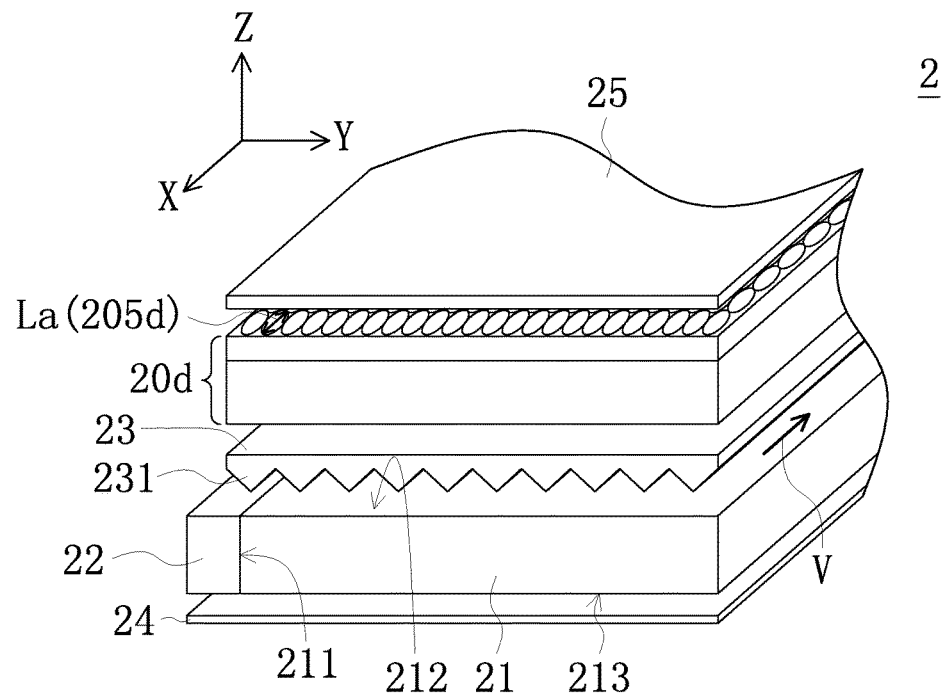
FIG. 7A is a schematic three-dimensional diagram of a portion of a backlight module according to an embodiment of the invention.

FIG. 7A is a schematic three-dimensional diagram of a portion of a backlight module according to an embodiment of the invention. Referring to FIG. 7A, the backlight module 2 includes a light adjusting sheet 20d, a light guide plate 21, a light source 22, a prism sheet 23, a reflection sheet 24 and a diffusion sheet 25. The light guide plate 21 has a light entering surface 211, a light emitting surface 212 and a bottom surface 213 opposite to the light emitting surface 212. The light source 22 is disposed beside the light entering surface 211 of the light guide plate 21 and configured to provide a light beam to the light guide plate 21. The prism sheet 23 is disposed above the light emitting surface 212 of the light guide plate 21. The light adjusting sheet 20d is disposed above the prism sheet 23. The reflection sheet 24 is disposed under the bottom surface 213 of the light guide plate 21. The diffusion sheet 25 is disposed above the light adjusting sheet 20d.

In the embodiment, the light guide plate 21 is, for example, a reverse prism light guide plate, whereas the prism sheet 23 is, for example, an inverse prism sheet. The prism sheet 23 includes a plurality of stripe structures 231 protruding toward the light emitting surface 212 of the light guide plate 21, wherein lengthwise directions V of the stripe structures 231 are in parallel with the direction X. That is, the lengthwise directions V of the stripe structures 231 of the prism sheet 23 are in parallel with the major axes La of the light adjusting structures 205d of the light adjusting sheet 20d. In addition, the structure of the light adjusting sheet 20d is described above, and detailed description of the structure of the light adjusting sheet 20d is omitted here.

Figure 1A:
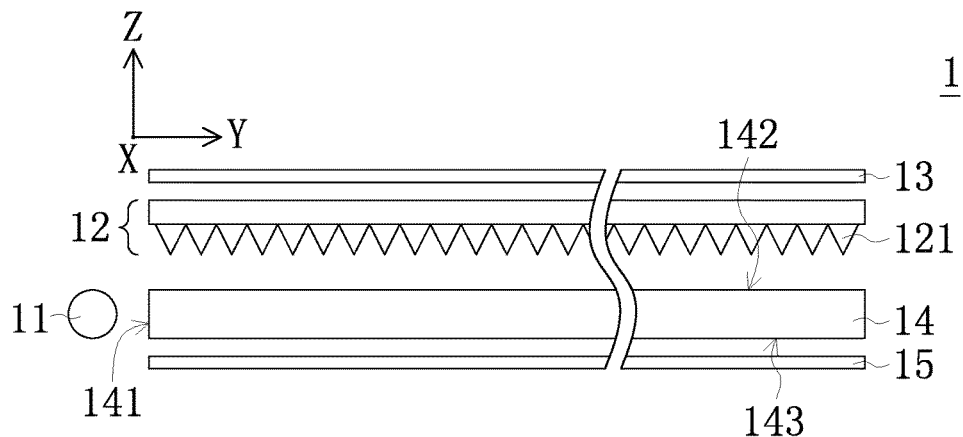
FIG. 1A is a cross-section schematic diagram of a conventional backlight module.
Figure 1B:
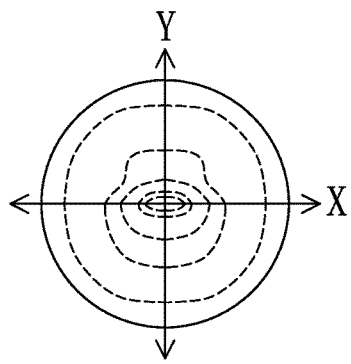
FIG. 1B is a viewing angle diagram showing a horizontal viewing angle and a vertical viewing angle of a light beam provided by the backlight module of FIG. 1A.
Figure 7B:
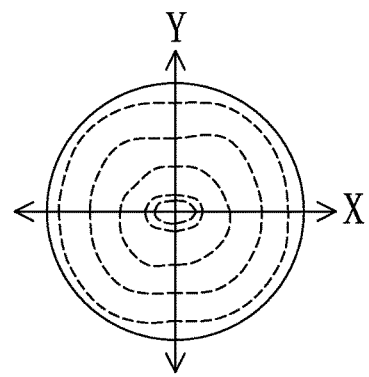
FIG. 7B is a viewing angle diagram showing a horizontal viewing angle and a vertical viewing angle of a light beam provided by the backlight module of FIG. 7A.

FIG. 7B is a viewing angle diagram showing a horizontal viewing angle and a vertical viewing angle of a light beam provided by the backlight module of FIG. 7A. Referring to FIG. 7B, in the backlight module 2 having the prism sheet 23, since the light adjusting sheet 20d is disposed above the prism sheet 23, the difference between the horizontal viewing angle (direction X) and the vertical viewing angle (direction Y) is decreased (compared to FIG. 1B). Therefore, the vertical viewing angle (direction Y) of the prism sheet 23 can be increased by the light adjusting sheet 20d, whereas the horizontal viewing angle (direction X) is slightly changed, thereby improving the symmetry between the vertical viewing angle and horizontal viewing angle. As a result, the visually discomfort described in prior art is avoided when a user rotates a display apparatus having the backlight module 2 and watches the display apparatus from different directions.

Figure 8:
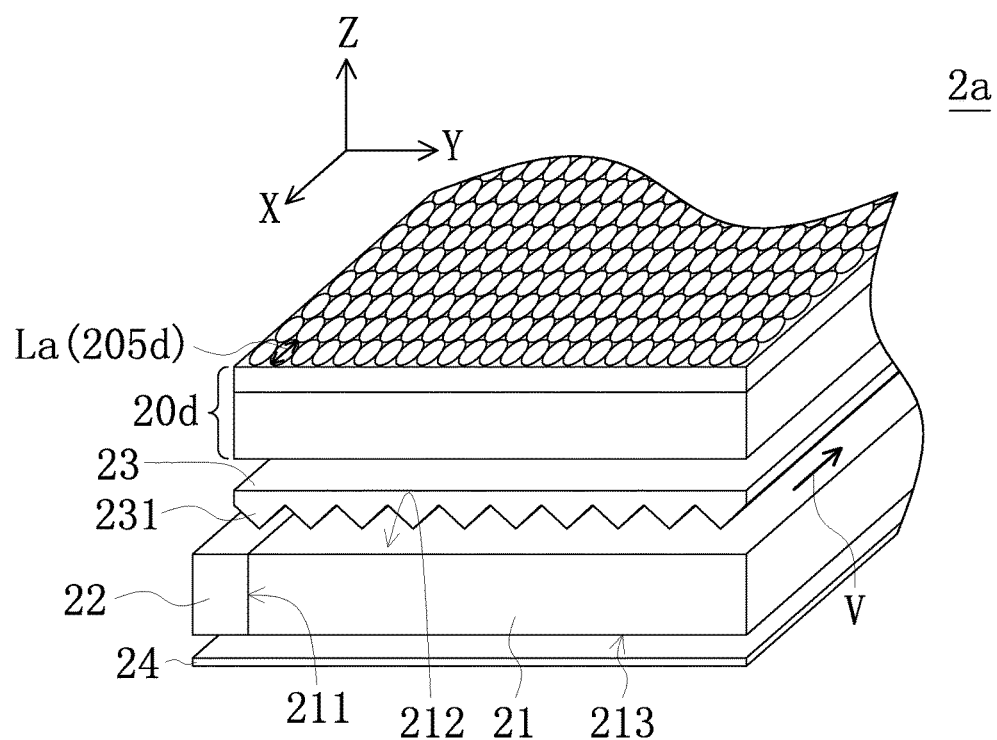
FIG. 8 is a schematic three-dimensional diagram of a portion of a backlight module according to another embodiment of the invention.

FIG. 8 is a schematic three-dimensional diagram of a portion of a backlight module according to another embodiment of the invention. Referring to FIG. 8, the backlight module 2a of the embodiment is similar to the backlight module 2 showed in FIG. 7. The difference is that the diffusion sheet 25 showed in FIG. 7 is omitted in the backlight module 2a showed in FIG. 8. The function of diffusion sheet 25 is replaced by the light adjusting sheet 20d. In other words, the light adjusting sheet 20d not only has the function to adjust the viewing angle, but also has the function to uniform the light beam.

It should be noted that the light adjusting sheet 20d in the backlight module 2 of FIG. 7 or the backlight module 2a of FIG. 8 can be replaced by any one of the light adjusting sheets 20, 20a, 20b and 20c showed in FIG. 2, FIG. 3, FIG. 4, FIG. 5 and FIG. 6.

FIG. 9A is a schematic diagram showing relations between a viewing angle, luminance and a ratio of a length of a minor axis to a length of a major axis when a thickness of the light adjusting structure is 2 μm, FIG. 9B is a schematic diagram showing relations between a viewing angle, luminance and a ratio of a length of a minor axis to a length of a major axis when a thickness of the light adjusting structure is 4 μm, and FIG. 9C is a schematic diagram showing relations between a viewing angle, luminance and a ratio of a length of a minor axis to a length of a major axis when a thickness of the light adjusting structure is 6 μm. Referring to FIG. 9A to 9C, when the thickness T is between 2 μm and 6 μm, the less the ratio of the length of the minor axis of the light adjusting structure to the length of the major axis of the light adjusting structure, the larger the corresponding vertical viewing angle. The horizontal viewing angle has almost no change in different ratios of the length of the minor axis to the length of the major axis. However, when the ratio of the length of the minor axis to the length of the major axis is too small (for instance the ratio is about 0.1), the luminance is too low. When the ratio of the length of the minor axis to the length of the major axis is too large (for instance the ratio is about 0.8), the vertical viewing angle is decreased. On the other hand, the vertical viewing angle is changed depending on the thickness T when the length of the minor axis is equal to the length of the major axis. The larger thickness T (for instance the thickness T is 6 μm), the larger vertical viewing angle. Thus, in order to achieve higher luminance and wider vertical viewing angle, the ratio of the length of the minor axis to the length of the major axis is designed between 0.093 to 0.6 and the thickness T is designed between 2 μm to 6 μm. Such that, the vertical viewing angle (direction Y) of the prism sheet 23 is increased, and the difference between the horizontal viewing angle and the vertical viewing angle of the emitting light beam is decreased to improve the symmetry between the vertical viewing angle and the horizontal viewing angle.

In summary, the embodiments of the invention may have at least one of following advantages. The light adjusting sheet of the embodiments has the light adjusting structure layer with the light adjusting structures, wherein the ratio of the length of the minor axis to the length of the major axis of the light adjusting structure is between 0.093 and 0.6, and the thickness of the light adjusting structure is between 2 μm and 6 μm. Applying the light adjusting sheet of the embodiments of the invention to the backlight module can increase the vertical viewing angle of the inverse prism sheet to make the vertical viewing angle be more symmetric with respect to the horizontal viewing angle and further prevent the visual defects such as the hot spots or the mura.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. A light adjusting sheet comprising: a base having a first surface and a second surface opposite to the first surface; and a first light adjusting structure layer disposed on the first surface of the base, the first light adjusting structure layer comprising a plurality of light adjusting structures, each light adjusting structure having a major axis, a minor axis and a thickness, wherein the major axis of each light adjusting structure is in parallel with an extending direction, a ratio of a length of the minor axis to a length of the major axis is between 0.093 and 0.6, and the thickness is between 2 μm and 6 μm, wherein the lengths of the major axes of the light adjusting structures, the lengths of the minor axes of the light adjusting structures and the thicknesses of the light adjusting structures are changed randomly.

2. The light adjusting sheet according to claim 1, wherein the light adjusting structures are at least disposed in a first column and a second column, the lengths of the minor axes of two adjacent light adjusting structures in the first column are the same, and the length of the minor axis of each light adjusting structure in the first column is different from the length of the minor axis of each light adjusting structure in the second column.

3. The light adjusting sheet according to claim 2, wherein in each of the first column and the second column, the lengths of the major axes of at least two of the light adjusting structures are different, and the thicknesses of at least two of the light adjusting structures are different.

4. The light adjusting sheet according to claim 2, wherein the light adjusting structures in the first column are arranged in a first linear line, the light adjusting structures in the second column are arranged in a second linear line, and the first linear line and the second linear line are extended in parallel with the extending direction.

5. The light adjusting sheet according to claim 2, wherein the light adjusting structures in the first column are arranged in a first continuous curved line, the light adjusting structures in the second column are arranged in a second continuous curved line, and the first continuous curved line and the second continuous curved line are extended along the extending direction.

6. The light adjusting sheet according to claim 5, wherein the first continuous curved line and the second continuous curved line are defined by a sine function or a cosine function.

7. The light adjusting sheet according to claim 6, wherein the first continuous curved line is defined by the sine function, and the second continuous curved line is defined by the cosine function.

8. The light adjusting sheet according to claim 2, wherein at least two of the light adjusting structures in the first column are partially overlapped with each other, and at least two of the light adjusting structures in the second column are partially overlapped with each other.

9. The light adjusting sheet according to claim 8, wherein at least one of the light adjusting structures in the first column is partially overlapped with at least one of the light adjusting structures in the second column.

10. The light adjusting sheet according to claim 1, wherein at least one of the light adjusting structures is partially overlapped with at least one adjacent light adjusting structure.

11. The light adjusting sheet according to claim 1, wherein each light adjusting structure is a hemispheric three-dimensional structure having a convex surface protruded from the first surface, or a hemispheric three-dimensional structure having a concave surface recessed from the first surface.

12. The light adjusting sheet according to claim 1, further comprising a second light adjusting structure layer disposed on the second surface of the base.

13. A backlight module comprising: a light guide plate comprising a light entering surface, a light emitting surface, and a bottom surface opposite to the light emitting surface; a light source disposed beside the light entering surface of the light guide plate and configured to provide a light beam to the light guide plate; a prism sheet disposed above the light emitting surface of the light guide plate; a light adjusting sheet claimed in claim 1 and disposed above the prism sheet, and a reflection sheet disposed under the bottom surface of the light guide plate.

14. The backlight module according to claim 13, further comprising a diffusion sheet disposed above the light adjusting sheet.

15. The backlight module according to claim 13, wherein the prism sheet is an inverse prism sheet, the inverse prism sheet comprising a plurality of stripe structures protruded toward the light emitting surface of the light guide plate, lengthwise directions of the stripe structures are in parallel with the extending direction.

16. The backlight module according to claim 13, wherein the light guide plate comprises a reverse prism light guide plate.

17. The backlight module according to claim 13, wherein the prism sheet comprises a plurality of strip structures, and lengthwise directions of the stripe structures of the prism sheet are in parallel with the major axes of the light adjusting structures of the light adjusting sheet.

18. A light adjusting sheet comprising: a base having a first surface and a second surface opposite to the first surface; and a first light adjusting structure layer disposed on the first surface of the base, the first light adjusting structure layer comprising a plurality of light adjusting structures, each light adjusting structure having a major axis, a minor axis and a thickness, wherein the major axis of each light adjusting structure is in parallel with an extending direction, a ratio of a length of the minor axis to a length of the major axis is between 0.093 and 0.6, and the thickness is between 2 µm and 6 µm, wherein the light adjusting structures are at least disposed in a first column and a second column, the lengths of the minor axes of two adjacent light adjusting structures in the first column are the same, and the length of the minor axis of each light adjusting structure in the first column is different from the length of the minor axis of each light adjusting structure in the second column.

19. A backlight module comprising: a light guide plate comprising a light entering surface, a light emitting surface, and a bottom surface opposite to the light emitting surface; a light source disposed beside the light entering surface of the light guide plate and configured to provide a light beam to the light guide plate; a prism sheet disposed above the light emitting surface of the light guide plate; a light adjusting sheet claimed in claim 18 and disposed above the prism sheet, and a reflection sheet disposed under the bottom surface of the light guide plate.

* * * * *